(12) United States Patent
Aminaka

(10) Patent No.: US 8,824,390 B2
(45) Date of Patent: Sep. 2, 2014

(54) METHOD AND APPARATUS FOR DETERMINING A FREQUENCY CHANNEL FOR USE IN RADIO COMMUNICATION WITH A MOBILE TERMINAL

(75) Inventor: Hiroaki Aminaka, Tokyo (JP)

(73) Assignee: NEC Corporation, Tokyo (JP)

( * ) Notice: Subject to any disclaimer, the term of this patent is extended or adjusted under 35 U.S.C. 154(b) by 642 days.

(21) Appl. No.: 13/129,532

(22) PCT Filed: Nov. 13, 2009

(86) PCT No.: PCT/JP2009/006087
§ 371 (c)(1), (2), (4) Date: May 16, 2011

(87) PCT Pub. No.: WO2010/064365
PCT Pub. Date: Jun. 10, 2010

(65) Prior Publication Data
US 2011/0222502 A1 Sep. 15, 2011

(30) Foreign Application Priority Data
Dec. 3, 2008 (JP) ................................ 2008-308709

(51) Int. Cl.
*H04W 72/04* (2009.01)
*H04W 72/06* (2009.01)
*H04W 72/10* (2009.01)

(52) U.S. Cl.
CPC ...... *H04W 72/0426* (2013.01); *H04W 72/0453* (2013.01); *H04W 72/0493* (2013.01); *H04W 72/06* (2013.01); *H04W 72/10* (2013.01)
USPC .......................................... 370/329; 370/330

(58) Field of Classification Search
None
See application file for complete search history.

(56) References Cited

U.S. PATENT DOCUMENTS

| 6,016,427 A * | 1/2000 | Barber et al. ................. 455/434 |
| 6,405,038 B1 * | 6/2002 | Barber et al. ................. 455/434 |
| 6,405,048 B1 * | 6/2002 | Haartsen ....................... 455/464 |

(Continued)

FOREIGN PATENT DOCUMENTS

| CN | 1989775 A | 6/2007 |
| CN | 101053267 A | 10/2007 |

(Continued)

OTHER PUBLICATIONS

3GPP, R1-084029, 25.211 CR0257R3 (Rel-8, B) "Introduction of Dual-Cell HSDPA Operation on Adjacent Carriers", Oct. 2008.

(Continued)

*Primary Examiner* — Robert C Scheibel
(74) *Attorney, Agent, or Firm* — Sughrue Mion, PLLC

(57) ABSTRACT

To suppress interference that a base station capable of autonomously selecting a frequency channel to be used in a cell formed by the base station itself (own cell) exerts on a primary cell and a non-HSDPA. A base station 1 includes a radio communication unit 11 and a frequency channel control unit 15. The radio communication unit 11 wirelessly communicates with a mobile station. The control unit 15 determines a frequency channel to be used in an own cell formed by the radio communication unit 11. Further, the frequency channel control unit 15 identifies whether or not a nearby cell formed by a nearby base station is a secondary cell that is dependently formed under condition of generation of a primary cell, and preferentially selects a frequency channel different from that used in a nearby non-secondary cell as a frequency channel to be used in the own cell.

23 Claims, 14 Drawing Sheets

(56) References Cited

U.S. PATENT DOCUMENTS

| | | | |
|---|---|---|---|
| 8,121,100 B2* | 2/2012 | Robson et al. | 370/338 |
| 2008/0070565 A1 | 3/2008 | Maeda | |
| 2008/0085720 A1* | 4/2008 | Hirano et al. | 455/452.1 |
| 2008/0102794 A1* | 5/2008 | Keevill et al. | 455/411 |
| 2008/0130593 A1 | 6/2008 | Scheinert et al. | |
| 2009/0046625 A1* | 2/2009 | Diener et al. | 370/319 |
| 2009/0082027 A1* | 3/2009 | Yavuz et al. | 455/446 |
| 2010/0130219 A1* | 5/2010 | Cave et al. | 455/450 |
| 2010/0317405 A1* | 12/2010 | Keevill et al. | 455/561 |
| 2010/0322426 A1* | 12/2010 | Keevill et al. | 380/270 |
| 2013/0089055 A1* | 4/2013 | Keevill et al. | 370/329 |

FOREIGN PATENT DOCUMENTS

| | | | |
|---|---|---|---|
| GB | 2428937 A | | 2/2007 |
| JP | 2007-529915 A | | 10/2007 |
| JP | 2008-178030 A | | 7/2008 |
| WO | 2006/054341 A1 | | 5/2006 |

OTHER PUBLICATIONS

3GPP, R1-084030, 25.212 CR0267R3 (Rel-8, B) "Introduction of Dual-Cell HSDPA Operation on Adjacent Carriers", Oct. 2008.

3GPP, R1-084031, 25.214 CR0497R4 (Rel-8, B) "Introduction of Dual-Cell HSDPA Operation on Adjacent Carriers", Oct. 2008.

3GPP, TR25.820 V8.2.0, "3G Home NodeB Study Item Technical Report", Sep. 2008.

Office Action, dated Dec. 18, 2013, issued by the State Intellectual Property Office of the People's Republic of China, in counterpart Application No. 200980148131.1.

* cited by examiner

|   | AVAILABLE STATUS | RSCP (dBm) |
|---|---|---|
| F1 | AVAILABLE | < -100 |
| F2 | AVAILABLE | -65 |
| F3 | UNAVAILABLE | -85 |

F1 ⇐ UNUSED (NOT-RECEIVED)
F2 ⇐ SECONDARY CELL
F3 ⇐ PRIMARY CELL OR NON-HSDPA CELL

Fig. 6A

|   | AVAILABLE STATUS | RSCP (dBm) |
|---|---|---|
| F1 | UNAVAILABLE | -70 |
| F2 | UNAVAILABLE | -65 |
| F3 | UNAVAILABLE | -85 |

F1 ⇐ PRIMARY CELL OR NON-HSDPA CELL
F2 ⇐ PRIMARY CELL OR NON-HSDPA CELL
F3 ⇐ PRIMARY CELL OR NON-HSDPA CELL

Fig. 6B

METHOD AND APPARATUS FOR DETERMINING A FREQUENCY CHANNEL FOR USE IN RADIO COMMUNICATION WITH A MOBILE TERMINAL

CROSS REFERENCE TO RELATED APPLICATIONS

This application is a National Stage of International Application No. PCT/JP2009/006087 filed Nov. 13, 2009, which claims priority from Japanese Patent Application No. 2008-308709 filed Dec. 3, 2008, the contents of all of which are incorporated herein by reference in their entirety.

TECHNICAL FIELD

The present invention relates to a base station capable of autonomously determining a frequency channel for use in radio communication with a mobile station.

BACKGROUND ART

As one of technologies to increase the communication speed of mobile stations located at cell edges, DC-HSDPA (Dual Cell-HSDPA operation) using existing HSDPA (High Speed Downlink Packet Access) has been examined in 3GPP (3rd Generation Partnership Project). DC-HSDPA uses two frequency channels (each of which is 5 MHz) contained in the same frequency band in order to increase the downlink speed. The general idea of DC-HSDPA, which has been currently examined in 3GPP, is explained hereinafter. Note that the details of DC-HSDPA technique, which has been currently proposed, are explained in Non-patent literatures 1 to 3 cited below.

In DC-HSDPA, a second serving HS-DSCH cell is referred to as "secondary-serving HS-DSCH cell". Meanwhile, a first serving HS-DSCH cell is simply referred to as "serving HS-DSCH cell". A secondary-serving HS-DSCH cell is dependently formed on condition that a serving HS-DSCH cell is already generated. Note that the serving HS-DSCH cell may be also referred to as "primary carrier" or "base carrier". Meanwhile, the secondary-serving HS-DSCH cell may be also referred to as "secondary carrier" or "extended carrier".

In this specification, in order to clearly distinguish between these two serving HS-DSCH cells, the first serving HS-DSCH cell is referred to as "primary-serving HS-DSCH cell". Further, in the following explanation, the primary-serving HS-DSCH cell and the secondary-serving HS-DSCH cell may be also referred to as simply "primary cell" and "secondary cell" respectively. Further, to distinguish the secondary cell from other cells, the primary cell and a non-HSDPA cell are collectively referred to as "non-secondary cell". The non-HSDPA cell is an ordinary cell generated by a base station that supports neither HSDPA nor DC-HSDPA.

FIG. 13 shows physical channels used to perform packet communication with DC-HSDPA between a base station (Node B) 91 supporting DC-HSDPA and a mobile station 92. HS-PDSCH is a downlink physical channel for data transmission, and transfers a transport channel HS-DSCH. HS-SCCH is used for transmission of downlink signaling information about HS-DSCH transfer. HS-DPCCH is an uplink physical channel used to transmit, from the mobile station 92 to the base station 91, feedback information about HS-DSCH transfer. This feedback information includes an ACK response regarding a hybrid ARQ (Automatic repeat-request), and a CQI (channel Quality Indication). The uplink DPCH and downlink DPCH are used to transmit/receive control information about DC-HSDPA. Needless to say, other common physical channels indispensable to the generation of the primary cell (such as P-CPICH, SCH, P-CCPCH and S-CCPCH) and common physical channels indispensable to the generation of the secondary cell (such as P-CPICH and SCH) are also used. The formal names of these physical channels and transport channels, which are shown above in abbreviated names, are shown below P-CPICH: Primary Common Pilot Channel
DPCH: Dedicated Physical Channel
HS-DPCCH: Dedicated Physical Control Channel (uplink) for HS-DSCH
HS-DSCH: High Speed Downlink Shared Channel
HS-PDSCH: High Speed Physical Downlink Shared Channel
HS-SCCH: Shared Control Channel for HS-DSCH
P-CCPCH: Primary Common Control Physical Channel
S-CCPCH: Secondary Common Control Physical Channel
SCH: Synchronisation Channel When two serving HS-DSCH cells are established in a base station supporting DC-HSDPA, the activation and deactivation of the secondary cell are controlled by the base station. A command (HS-SCCH Order) that is used by the base station to instruct a mobile station (UE) on the activation and deactivation of the secondary cell is transmitted to the mobile station by using HS-SCCH, which is a downlink control channel. Further, the activation and deactivation of the secondary cell may be also changed by transmitting an RRC message from the base station or a radio network controller (RNC) to the mobile station. The details of the message structure and the like of the RRC MESSAGE are explained in 3 GPP TS 25.331 V8.4.0 (2008-09) "Radio Resource Control (RRC)".

Meanwhile, as the indoor voice communication and data transmission have grown in demand owing to the widespread use of mobile phones, the development of compact base stations that can be installed in user's houses, offices, and the likes has been under way. These compact base stations are installed in houses, small-scale offices, and the likes by the owners of the compact base stations, for example, and are connected to an upper layer apparatus on core-network sides by using ADSLs (Asymmetric Digital Subscriber Lines) and fiber-optic lines. In 3GPP, the standardization task has been under way while defining these compact base stations as "Home NodeB" and "Home eNodeB" (for example, see Non-patent literature 4). Note that "Home NodeB" is a compact base station for use in UMTS (Universal Mobile Telecommunications System), while the "Home eNodeB" is a compact base station for use in LTE (Long Term Evolution). In this specification, these compact base stations are referred to as "home base stations", and cells generated by these home base stations are referred to as "home cells".

In base stations used in existing mobile communication networks (cellular communication networks), radio resources to be used in communications between the base stations and mobile stations are determined in advance. In contrast to this, as for the home base stations, a technique to make a home base station autonomously select a radio resource has been examined. Note that the radio resources mean frequency channels in FDMA (Frequency Division Multiple Access) systems, whereas they mean spreading codes in CDMA (Code Division Multiple Access) systems. In the case of 3GPP UMTS (W-CDMA: Wideband-CDMA), the radio resources mean frequency channels and scrambling codes. Further, in the case of 3GPP LTE in which SC-FDMA (Single Carrier FDMA) is used for the uplink and OFDMA (Orthogonal FDMA) is used for the downlink, the radio resources means physical resource blocks. The physical resource block is the unit of the radio resources used for downlink data transmission from a base station to a mobile station, and includes a plurality of OFDM subcarriers in the frequency domain and at least one symbol time in the time domain.

Patent literature 1 discloses a home base station that receives a permission list including a plurality of radio resource candidates (specifically, frequency channels and scrambling codes) from an administration system to which the home base station is connected through an xDSL line, a fiber-optic line, or the like, and measures a received signal strength and a CIR (Carrier to Interference Ratio) of a radio signal for each of the radio resource candidates included in the permission list. Further, the home base station disclosed in Patent literature 1 autonomously select a radio resource candidate having the lowest received signal strength and uses the selected radio resource for communication with a mobile station. The reason why the radio resource candidate having the lowest received signal strength is selected is that, by doing so, the interference with cells formed by nearby base stations is believed to be minimized. Further, the home base station disclosed in Patent literature 1 determines the initial transmission power of transmission using the selected radio resource by using the previously-measured received signal strength and CIR. Specifically, the initial transmission power is determined with consideration given to the interference level from the nearby base stations so that satisfactory communication service can be provided in a desired communication range (e.g., within 20 m).

CITATION LIST

Patent Literature

Patent literature 1: U.K. Patent Application Publication No. 2428937 (page 14, line 8 to page 15, line 21)

Non Patent Literature

Non patent literature 1: 3GPP, R1-084029, 25.211 CR0257R3 (Rel-8, B) "Introduction of Dual-Cell HSDPA Operation on Adjacent Carriers", October 2008
Non patent literature 2: 3GPP, R1-084030, 25.212 CR0267R3 (Rel-8, B) "Introduction of Dual-Cell HSDPA Operation on Adjacent Carriers", October 2008
Non patent literature 3: 3GPP, R1-084031, 25.214 CR0497R4 (Rel-8, B) "Introduction of Dual-Cell HSDPA Operation on Adjacent Carriers", October 2008
Non patent literature 4: 3GPP, TR25.820 V8.2.0, "3G Home NodeB Study Item Technical Report", September 2008

SUMMARY OF INVENTION

Technical Problem

The inventors of the present application have considered frequency channel selection performed by a home base station in a case where the home base station is installed on the periphery of a base station supporting DC-HSDPA. When DC-HSDPA is used, the priority of communication service provided by secondary cell is supposed to be relatively low compared to the communication service provided by non-secondary cells (primary cells and non-HSDPA cells). Further, secondary cells are supposed to be used in a temporary fashion when high-speed data transfer is required. Therefore, it is presumed that the average interference level in nearby cells caused by secondary cells is low compared to those caused by non-secondary cells that are constantly used.

The home base station disclosed in Patent literature 1 determines a frequency channel to be allocated to a cell that is formed by the home base station itself based on the received power of a signal transmitted wirelessly from a nearby base station. Assume that during a period in which the home base station disclosed in Patent literature 1 is measuring a signal from a nearby cell, the nearby cell is using a secondary cell. In this case, the received power from the nearby secondary cell, observed by the home base station, could become larger compared to the received power from a nearby primary cell or non-HSDPA cell. Therefore, there is a possibility that the home base station disclosed in Patent literature 1 could inadvertently select the same frequency channel as that used in the nearby primary cell or non-HSDPA cell as a frequency channel to be allocated to the cell that is formed by the home base station itself in order to avoid the interference with the temporarily-used nearby second cell. The operation like this deteriorates the validity of the frequency channel selection performed in the home base station.

The present invention has been made based on the above-described consideration, and an object thereof is to suppress interference to a nearby non-secondary cell caused by a base station capable of autonomously selecting a frequency channel to be used in a cell formed by the base station itself (own cell).

Solution to Problem

A base station apparatus in accordance with a first aspect of the present invention includes a radio communication unit and a frequency channel control unit. The radio communication unit wirelessly communicates with a mobile station. The frequency channel control unit determines a frequency channel to be used in an own cell formed by the radio communication unit. Further, the frequency channel control unit identifies whether or not a nearby cell formed by a nearby base station is a secondary cell that is dependently formed under condition of generation of a primary cell, and preferentially selects a frequency channel different from that used in a nearby non-secondary cell as the frequency channel to be used in the own cell.

A second aspect of the present invention is a control method of a base station apparatus. The method includes the following steps (a) and (b):
(a) a step of identifying whether or not a nearby cell formed by a nearby base station is a secondary cell that is dependently formed under condition of generation of a primary cell; and
(b) a step of selecting, as a frequency channel to be used in an own cell formed by the base station apparatus, a frequency channel different from a frequency channel used in a nearby non-secondary cell preferentially over the frequency channel used in the nearby non-secondary cell.

A third aspect of the present invention is a processing apparatus for use in a base station apparatus that wirelessly communicates with a mobile station. The processing apparatus executes a process of identifying whether or not a nearby cell formed by a nearby base station is a secondary cell that is dependently formed under condition of generation of a primary cell, and a process of preferentially selecting a frequency channel different from that used in a nearby non-secondary cell as a frequency channel to be used in an own cell formed by the base station apparatus.

A fourth aspect of the present invention is a program that causes a computer to execute control processing relating to a base station apparatus that wirelessly communicates with a mobile station. The control processing includes the following steps (a) and (b):

(a) a step of identifying whether or not a nearby cell formed by a nearby base station is a secondary cell that is dependently formed under condition of generation of a primary cell; and
(b) a step of selecting, as a frequency channel to be used in an own cell formed by the base station apparatus, a frequency channel different from a frequency channel used in a nearby non-secondary cell preferentially over the frequency channel used in the nearby non-secondary cell.

A radio communication system in accordance with a fifth aspect of the present invention includes first and second base stations. The first base station includes a radio communication unit and a frequency channel control unit. The radio communication unit wirelessly communicates with a mobile station. The frequency channel control unit identifies whether or not a nearby cell formed by the second base station is a secondary cell that is dependently formed under condition of generation of a primary cell, and preferentially selects a frequency channel different from that used in a nearby non-secondary cell as a frequency channel to be used in an own cell formed by the radio communication unit.

Advantageous Effects of Invention

According to the present invention, it is possible to suppress interference to a nearby non-secondary cell caused by a base station capable of autonomously selecting a frequency channel of its own cell.

BRIEF DESCRIPTION OF DRAWINGS

FIG. 6A shows a specific example of frequency channel measurement information;
FIG. 6B shows a specific example of frequency channel measurement information.

DESCRIPTION OF EMBODIMENTS

Specific exemplary embodiments to which the present invention is applied are explained hereinafter with reference to the drawings. The same signs are assigned to the same components throughout the drawings, and duplicated explanation is omitted as appropriate for simplifying the explanation.

First Exemplary Embodiment

Figure 1:
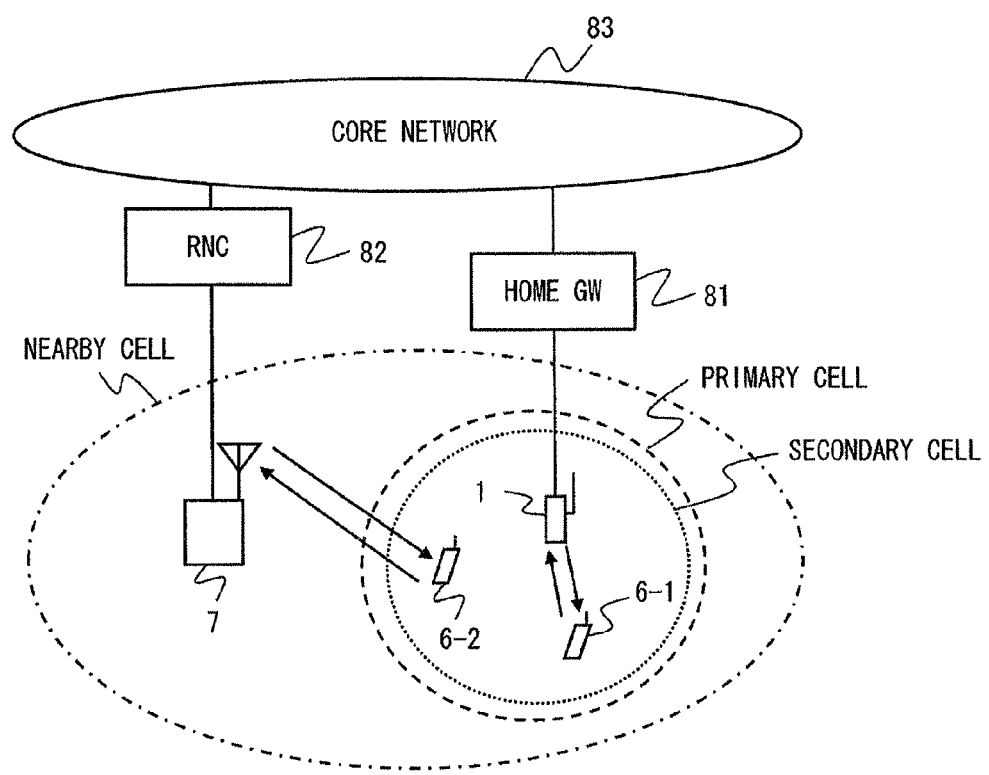
FIG. 1 is a configuration diagram of a radio communication system including a home base station in accordance with a first exemplary embodiment of the invention.

FIG. 1 shows a configuration example of a radio communication system including a home base station 1 in accordance with this exemplary embodiment. Note that the following explanation is made on the assumption that a radio communication system in accordance with this exemplary embodiment is a radio communication system of a FDD (Frequency Division Duplex)-CDMA type, more specifically, of a W-CDMA type.

The home base station 1 is connected to a core network 83 of a mobile communications company through a home gateway (home GW) 81, and relays traffic between a mobile station 6-1 and the core network 83. The home base station 1 is used in a state where the home base station 1 connected, for example, to a fixed communication line such as ADSL (Asymmetric Digital Subscriber Line), an optical fiber, and a coaxial cable, and is connected to the home GW 81 through an IP (Internet Protocol) communication network, the Internet, or the like.

The home base station 1 is a base station supporting DC-HSDPA, and generates a primary cell and a secondary cell having mutually different frequency channels. The home base station 1 transmits common physical channels (such as P-CPICH and SCH) used to form the primary and secondary cells, and also transmits a physical channel (HS-PDSCH) through which HS-DSCH is conveyed in each of the two serving HS-DSCH cells.

Further, the home base station 1 determines a frequency channel of the primary cell with consideration given to the frequency channels used in nearby cells. More specifically, the home base station 1 determines a frequency channel to be allocated to its own primary cell in such a manner that the overlap of the frequency channel of the primary cell with frequency channels used in nearby non-secondary cells (primary cells and non-HSDPA cells) is avoided as much as possible. In other words, the home base station 1 allocates, to its own primary cell, a frequency channel that is not used by any of the nearby cells or a frequency channel that is used in a nearby secondary cell preferentially over frequency channels that are used in nearby non-secondary cells (nearby primary cells and non-HSDPA cells). To perform frequency channel allocation in this manner, the home base station 1 identifies properties of nearby cells. Note that a specific example of a procedure to determine a frequency channel for the primary cell performed by the home base station 1 is explained later.

A nearby base station 7 generates a nearby cell, and communicates with a mobile station 6-2. In the example shown in FIG. 1, the nearby cell is a macro cell at an upper hierarchy that is formed so as to cover the home cell (primary and secondary cells) generated by the home base station 1. The nearby base station 7 is connected to the core network 83 through a radio network controller (RNC) 82, and relays traffic between the mobile station 6-2 and the core network 83. Note that the nearby base station 7 may be a home base station that forms a home cell. Further, although the following explanation is made on the assumption that the nearby base station 7 is a base station supporting DC-HSDPA, the nearby base station 7 may be a base station supporting only HSDPA for a single-cell operation. Alternatively, the nearby base station 7 may be a base station that supports neither HSDPA nor DC-HSDPA, and forms a non-HSDPA cell.

The home GW 81 transfers information between the home base station 1 and the core network 83. The RNC 82 performs communication control and information transfer between the mobile station 6-2 located in the nearby cell formed by the nearby base station 7 and the core network 83.

Figure 2:
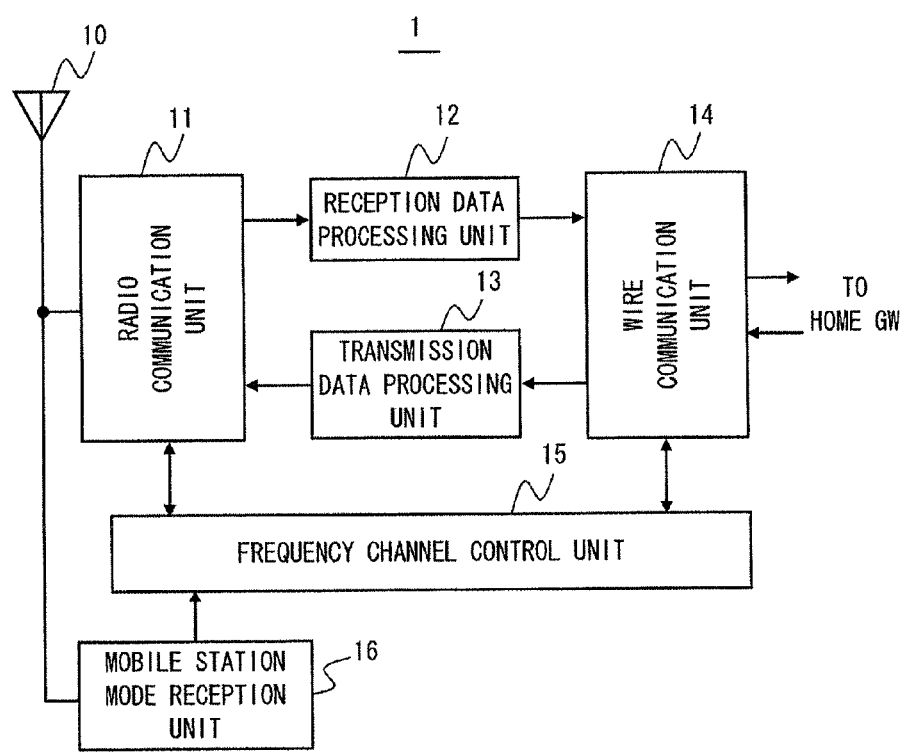
FIG. 2 is a block diagram showing a configuration example of a home base station in accordance with the first exemplary embodiment of the invention.

Next, a configuration example of the home base station 1 and a specific example of a frequency channel determination procedure for a primary cell are explained. FIG. 2 is a block diagram showing a configuration example of the home base station 1. In FIG. 2, a radio communication unit 11 receives an uplink signal transmitted from a mobile station 6-1, through an antenna 10.

A reception data processing unit 12 restores received data by performing various processes such as inverse spreading, RAKE combining, deinterleaving, channel decoding, and error correction on the received uplink signal. The obtained reception data is sent to the home GW 81 through a wire communication unit 14. Note that it has been examined to provide a home base station with an RNC function so that the home base station is able to perform autonomous radio resource control. Accordingly, the home base station 1 may have an RNC function. In the case where the home base station 1 has an RNC function, when the received data obtained by the reception data processing unit 12 is a location registration request or a radio channel establishment request from the mobile station 6-1, the reception data is sent to the RNC function unit (not shown) of the home base station 1 to perform these controls.

A transmission data processing unit 13 obtains, from the wire communication unit 14, transmission data to be transmitted toward the mobile station 6-1, and generate a transport channel by performing error correction encoding, rate matching, interleaving, and the like. Further, the transmission data processing unit 13 generates a radio frame by adding control information such as a TPC (Transmit Power Control) bit to a data series of the transport channel. Further, the transmission data processing unit 13 generates a transmission symbol string by performing spreading processing and symbol mapping. The radio communication unit 11 generates a downlink signal by performing various processes such as quadrature modulation, frequency conversion, and signal amplification on the transmission symbol string, and transmits the generated downlink signal to the mobile station 6-1.

A frequency channel control unit 15 determines frequency channels to be allocated to the primary and secondary cells.

A mobile station mode reception unit 16 receives a radio signal transmitted from the nearby base station 7 and measures its signal quality. The signal quality to be measured may be any physical quantity that varies according to the attenuation of the radio signal transmitted from the nearby base station 7. For example, the mobile station mode reception unit 16 may measure the received power (RSCP: Received Signal Code Power) of a common pilot channel P-CPICH transmitted from the nearby cell. Note that the receiving circuit of the radio communication unit 11 may be also used as the receiving circuit of the mobile station mode reception unit 16.

Figure 3:
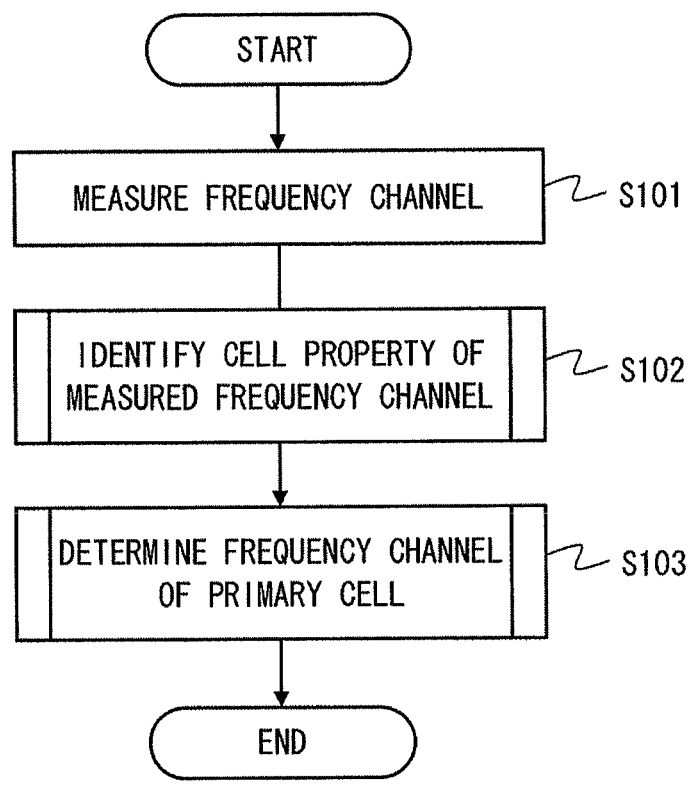
FIG. 3 is a flowchart showing an overall procedure of a process to determine a frequency to be allocated to a primary cell performed by a home base station in accordance with the first exemplary embodiment of the invention.

Next, a specific example of a procedure to determine a frequency channel to be allocated to the primary cell performed by the home base station 1 is explained. FIG. 3 is a flowchart showing an overall procedure to determine a frequency channel. In a step S101, the mobile station mode reception unit 16 performs signal reception for at least one frequency channel. As described previously, the mobile station mode reception unit 16 may measures the received power (RSCP) of P-CPICH transmitted from the nearby base station 7 in order to obtain the signal quality of a signal transmitted from the nearby cell. Further, for identifying a nearby cell (which is described later), the mobile station mode reception unit 16 may receive a predetermined physical channel (e.g., P-CCPCH).

In a step S102, the frequency channel control unit 15 identifies the cell property of the nearby cell using the measured frequency channel. Specifically, the frequency channel control unit 15 may identify whether or not the nearby cell is a secondary cell formed for DC-HSDPA. A specific example of a procedure to identify a cell property is explained hereinafter with reference to flowcharts shown in FIGS. 4 to 6.

Figure 4:
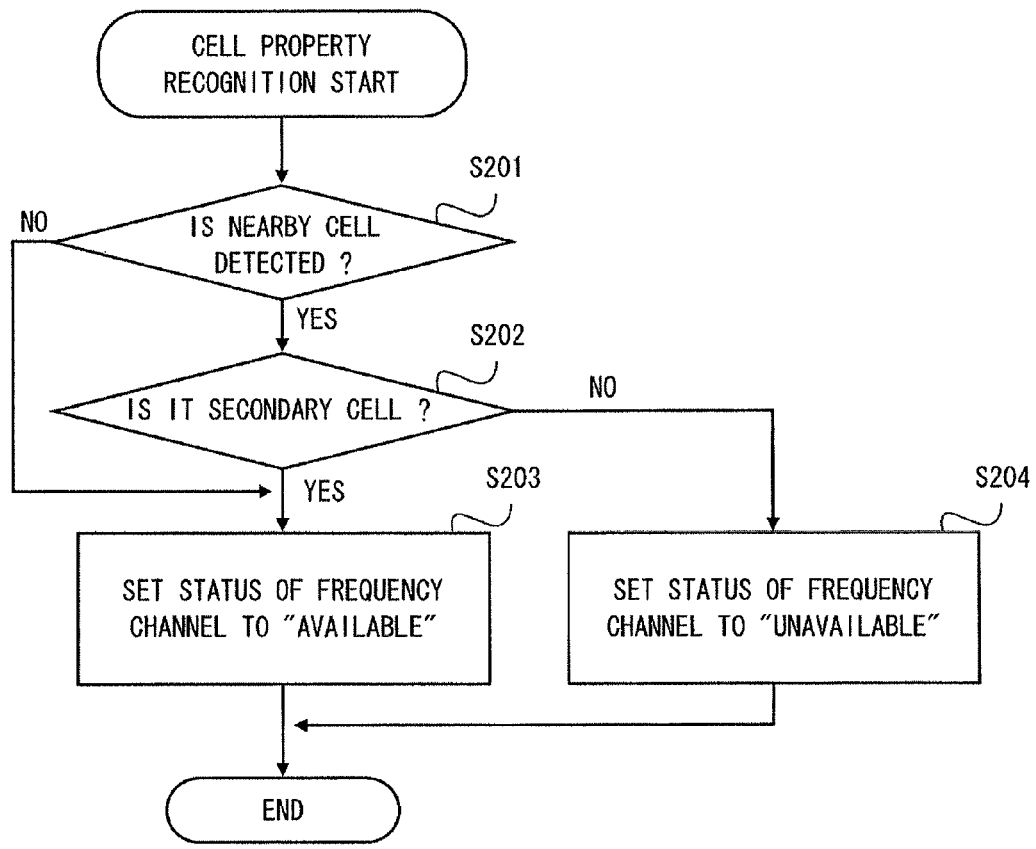
FIG. 4 is a flowchart showing a specific example of a cell property identification process.

FIG. 4 is a flowchart showing an example of a cell property identification process. In a step S201, the frequency channel control unit 15 determines whether any nearby cell is detected or not in the frequency channel for which measurement has been carried out. This decision may be made based on whether a common pilot channel (P-CPICH) has been received or not in the frequency channel for which the measurement has been carried out. For example, when the received power (RSCP) of P-CPICH is lower than a predetermined threshold (e.g., −100 dBm), the frequency channel control unit 15 may determine that that frequency channel is not used.

If a nearby cell is detected in the frequency channel for which the measurement has been carried out (Yes at step S201), the frequency channel control unit 15 determines whether the detected nearby cell is a secondary cell or not (step S202). Note that this decision can be also expressed in another way that it is determined whether the nearby cell is a non-secondary cell (primary cell or non-HSDPA cell) or not.

Two specific methods for determining whether a nearby cell is a secondary cell or not are explained hereinafter. A first determination method is a method of identifying a secondary cell based on whether a predetermined physical channel is being transmitted or not. This method can be used, for example, in cases where a broadcast channel (P-CCPCH) is transmitted in non-secondary cells (primary cells or non-HSDPA cells) but it is not transmitted in secondary cells. Note that P-CCPCH is a downlink common physical channel that is used to transfer a transport channel (BCH: Broadcast channel) carrying broadcast information.

Figure 5A:
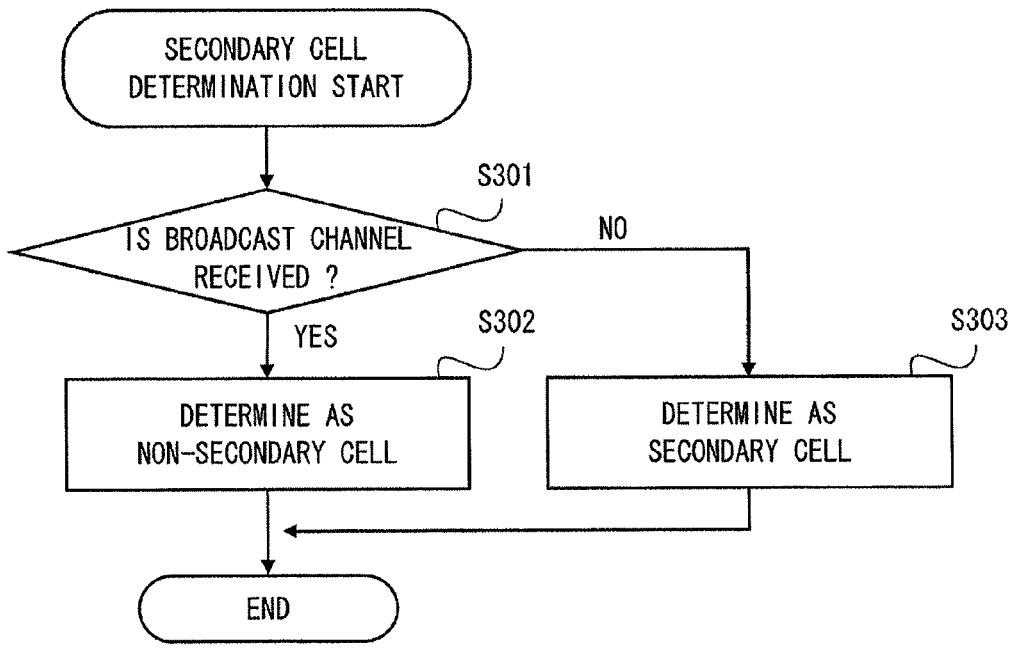
FIG. 5A is a flowchart showing a specific example of a process to determine whether the cell is a secondary cell or not.

FIG. 5A is a flowchart showing a procedure to execute the first determination method. In a step S301, the frequency channel control unit 15 determines whether or not a broadcast channel (P-CCPCH) is received in a frequency channel for which measurement has been carried out. If P-CCPCH is received, it determines that the nearby cell using that frequency channel is a non-secondary cell (step S302). On the other hand, if P-CCPCH is not received, the frequency channel control unit 15 determines that the nearby cell using that frequency channel is a secondary cell (step S303).

Next, a second method for determining whether a nearby cell is a secondary cell or not is explained. A second determination method is a method of identifying a secondary cell based on contents of predetermined information contained in a received signal from a nearby cell. This method can be used in cases where contents of transmission information are different between secondary cells and non-secondary cells. For example, the second method can be used in a case where access control information (Cell Barred) included in broadcast information is set to "valid value" indicating "there is access control" in secondary cells and it is set to "invalid value" indicating "there is no access control" in non-secondary cells. In this case, the frequency channel control unit 15 may determine whether the nearby cell is a secondary cell or not by referring to the access control information. Note that the details of the access control information (Cell Barred) are explained in 3GPP TS 25.331 V8.4.0 (2008-09) "Radio Resource Control (RRC)".

Figure 5B:
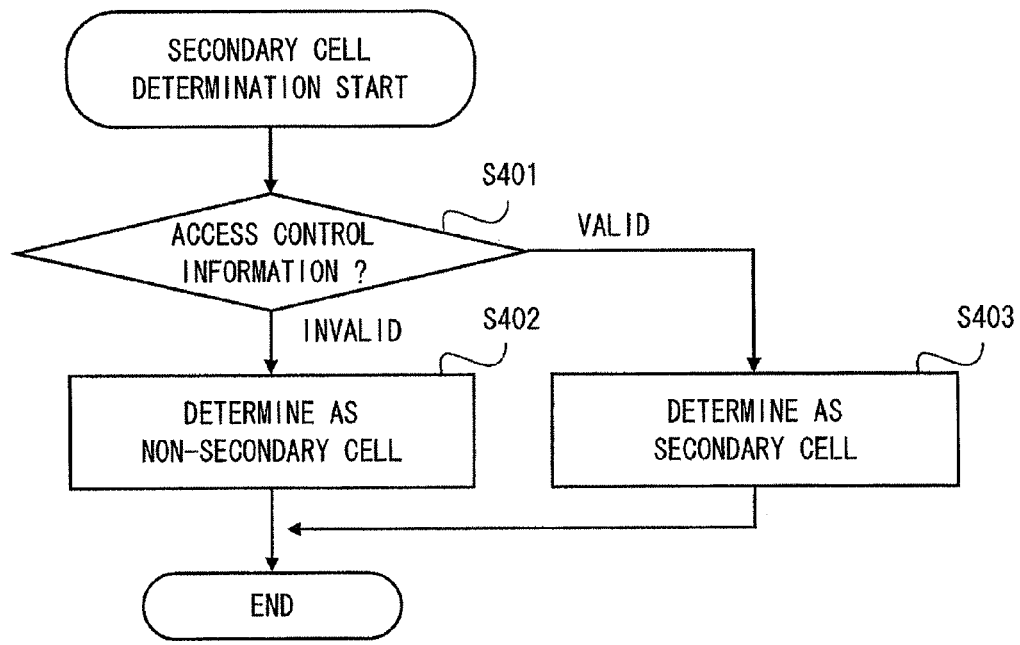
FIG. 5B is a flowchart showing a specific example of a process to determines whether the cell is a secondary cell or not.

FIG. 5B is a flowchart showing a procedure to execute the second determination method. In a step S401, the frequency channel control unit 15 determines the value of access control information received through a frequency channel for which measurement has been carried out. If the access control information indicates an invalid value, it determines that the nearby cell using that frequency channel is a non-secondary cell (step S402). On the other hand, if the access control information indicates a valid value, the frequency channel control unit 15 determines that the nearby cell using that frequency channel is a secondary cell (step S403).

Note that the above-described determination methods are merely examples. For example, identification information that enables a secondary cell to be identified may be included in broadcast information transmitted through a broadcast channel (P-CCPCH). In this case, the frequency channel control unit 15 may determine the cell property by referring to identification information included in broadcast information.

The explanation is continued by referring to FIG. 3 again. The frequency channel control unit 15 stores the identification result of the cell property obtained in the step S102 so that it will be used in a step S103. FIGS. 6A and 6B are tables showing examples of stored data of frequency channel measurement information including identification results of cell properties. The table of FIG. 6A includes identification results for three frequency channels F1 to F3.

In FIG. 6A, "available status" indicates a temporary identification result indicating whether the frequency channel is available to the primary cell or not for each of the frequency channels F1 to F3. When the frequency channel control unit 15 determines no nearby cell is detected or the detected nearby cell is a secondary cell, it may set the available status corresponding to that frequency channel to "available". On the other hand, when the frequency channel control unit 15 determines the detected nearby cell is a non-secondary cell, it may set the available status corresponding to that frequency channel to "unavailable".

In FIG. 6A, since RSCP of the frequency channel F1 is not larger than a predetermined threshold (e.g., −100 dBm), the frequency channel F1 is determined to be not used by any nearby cell. Therefore, the status for the frequency channel F1 is set to "available". Further, since the frequency channel F2 is determined to be used by a secondary cell, the status for the frequency channel F2 is set to "available". In contrast to these, since the frequency channel F3 is determined to be used by a non-secondary cell, the status for the frequency channel F3 is set to "unavailable".

The information stored in the table shown in FIG. 6B has similar meaning to that of FIG. 6A. In FIG. 6B, since all the frequency channels F1 to F3 are used by non-secondary cells, their statuses are set to "unavailable".

Note that even when a frequency channel is used by a non-secondary cell, the frequency channel control unit 15 may set the available status of that frequency channel to "available" if its RSCP is not larger than a predetermined threshold (e.g., −85 dBm).

In a step S103 in FIG. 3, the frequency channel control unit 15 determines a frequency channel to be allocated to the primary cell. The determination of the frequency channel to be allocated to the primary cell is made by using the identification result of the cell property obtained in the step S102. Specifically, the frequency channel control unit 15 allocates, to its own primary cell, frequency channels that are not used by any nearby cells and frequency channels that are used by nearby secondary cells preferentially over the frequency channels that are used in nearby non-secondary cells.

Figure 7:
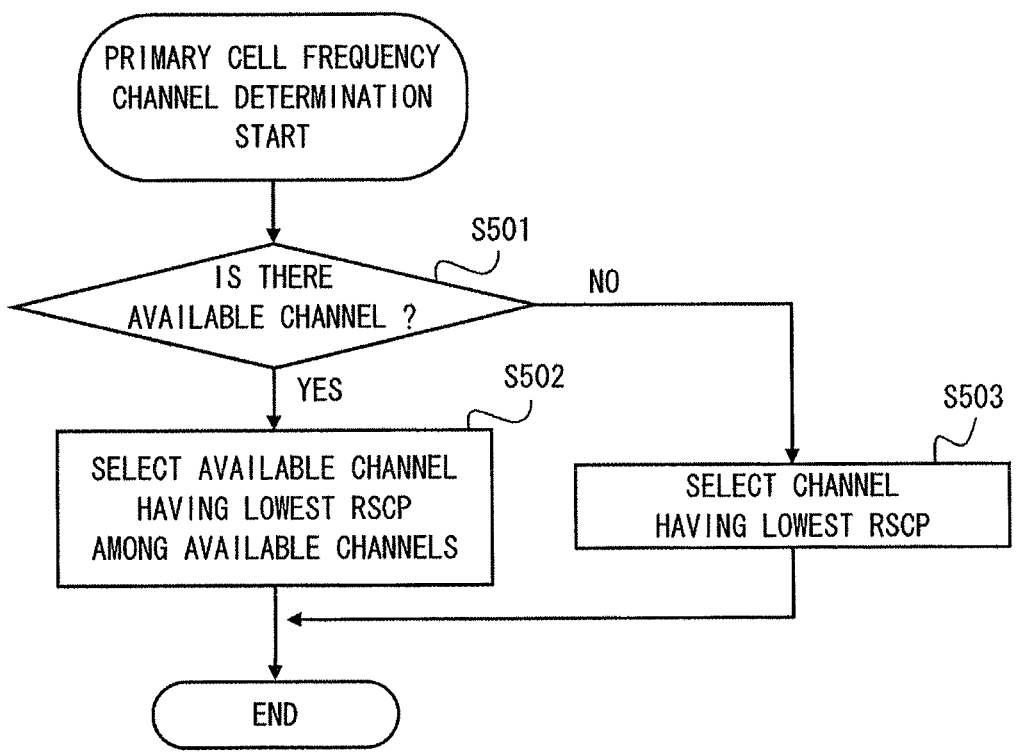
FIG. 7 is a flowchart showing a specific example of a process to determine a frequency to be allocated to a primary cell based on frequency channel measurement information.

FIG. 7 is a flowchart showing an example of processing steps in the step S103. The flowchart shown in FIG. 7 shows a procedure to determine a frequency channel for a primary cell by referring to frequency channel measurement information like the ones shown in FIGS. 6A and 6B.

In a step S501, the frequency channel control unit 15 refers to the frequency channel measurement information, and thereby determines whether there is any frequency channel whose available/unavailable status is labeled as "available". If there are any frequency channels labeled as "available" (Yes at step S501), the frequency channel control unit 15 selects, as a frequency channel for the primary cell, a frequency channel having the lowest RSCP from among the frequency channels labeled as "available" (step S502). For example, if the frequency channel measurement information shown in FIG. 6A is obtained, the frequency channel F1 is selected as a frequency channel for the primary cell of the home base station 1.

If there is no frequency channel labeled as "available" (No at step S501), the frequency channel control unit 15 selects, as a frequency channel for the primary cell, a frequency channel having the lowest RSCP from among the frequency channels labeled as "unavailable" (step S503). For example, if the frequency channel measurement information shown in FIG. 6B is obtained, the frequency channel F3 is selected as a frequency channel for the primary cell of the home base station 1.

Figure 8:
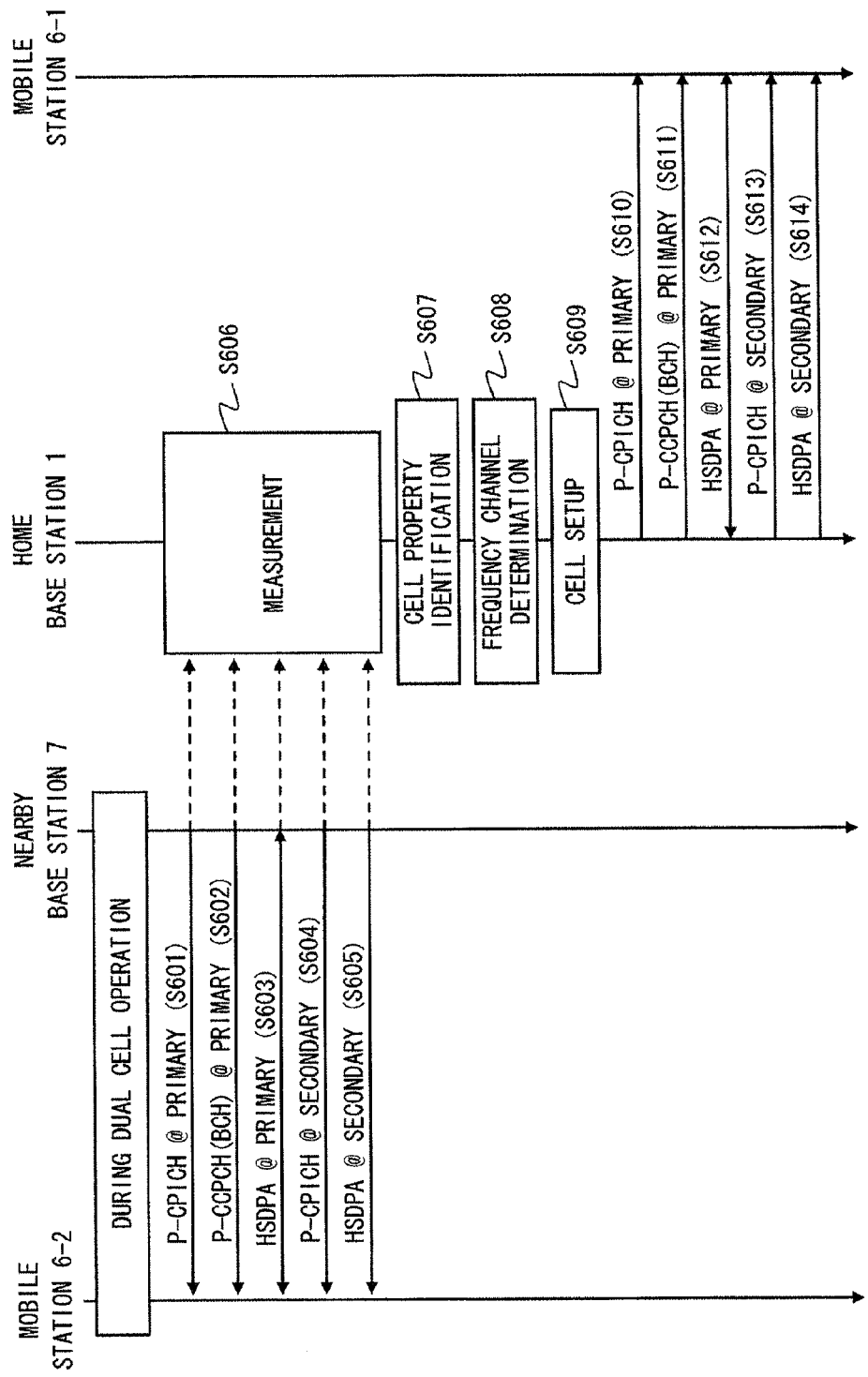
FIG. 8 is a sequence diagram showing an example of a procedure to determine a primary cell frequency channel in the first exemplary embodiment of the present invention.

FIG. 8 shows a sequence diagram showing interactions between the nearby base station 7, the home base station 1, the mobile station 6-1, and the mobile station 6-2 that are performed when a frequency channel to be allocated to the primary cell of the home base station 1 is determined. Note that FIG. 8 shows a case where the primary cell and the secondary cell have different channel configurations. Specifically, a common physical channel P-CCPCH for broadcasting is transmitted in the primary cell, while it is not transmitted in the secondary cell.

In steps S601 to S603, the home base station 1 transmits P-CPICH, P-CCPCH and a group of physical channels relating to HSDPA of the primary cell. The group of physical channels represented by "HSDPA@PRIMARY" in the figure includes a downlink HS-SCCH, a downlink HS-PDSCH, and an uplink HS-DPCCH. In steps S604 and S605, the nearby base station 1 transmits P-CCPCH and a group of physical channels relating to HSDPA of the secondary cell. The group of physical channels represented by "HSDPA@SECONDARY" in the figure includes a downlink HS-SCCH and a downlink HS-PDSCH. Note that the steps S601 to S605 are shown in the illustrated order just for the sake of convenience, and these physical channels are transmitted according to a predetermined timing relation with respect to SCH.

In a step S606, the home base station 1 receives a radio signal from a nearby cell and measures its quality. The step S606 corresponds to the step S101 of FIG. 3. In steps S607 and S608, the home base station 1 identifies the property of the nearby cell, and determines a frequency channel to be allocated to its own primary cell. The steps S607 and S608 correspond to the steps S102 and S103 of FIG. 3.

In a step S609, the home base station 1 sets up a primary cell and a secondary cell. In steps S610 to S614, the home base station 1 performs data transmission (HS-DSCH transfer) by using the primary and the secondary cells.

Figure 9A:
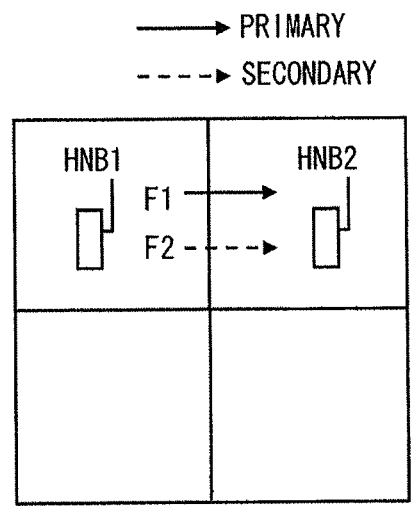
FIG. 9A is a conceptual diagram showing a state in which frequency channels of primary cells are successively determined.
Figure 9B:
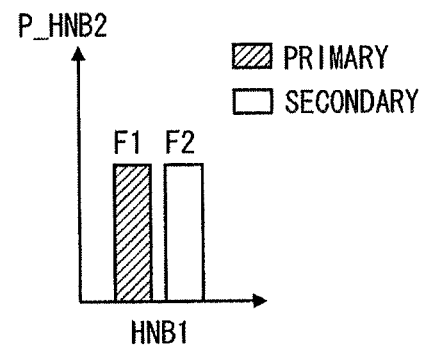
FIG. 9B is a graph showing received power in a home base station.
Figure 9C:
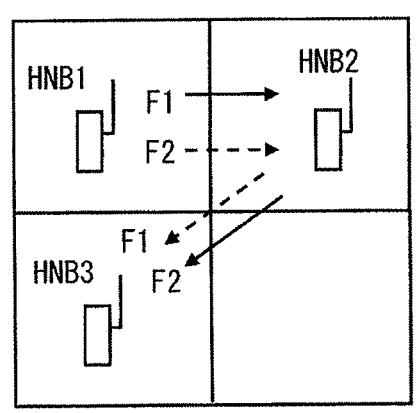
FIG. 9C is a conceptual diagram showing a state in which frequency channels of primary cells are successively determined.
Figure 9D:
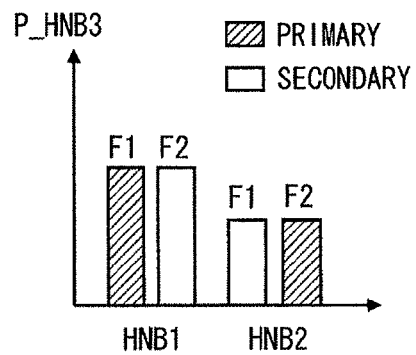
FIG. 9D is a graph showing received power in a home base station.
Figure 9E:
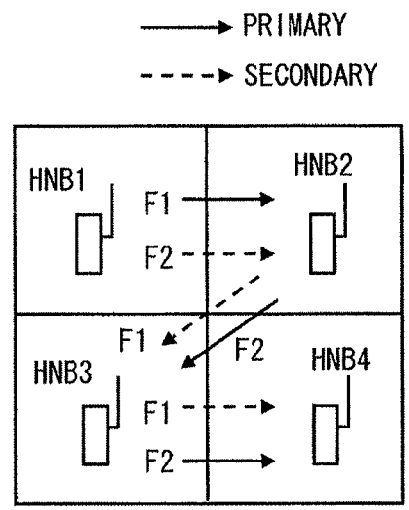
FIG. 9E is a conceptual diagram showing a state in which frequency channels of primary cells are successively determined.
Figure 9F:
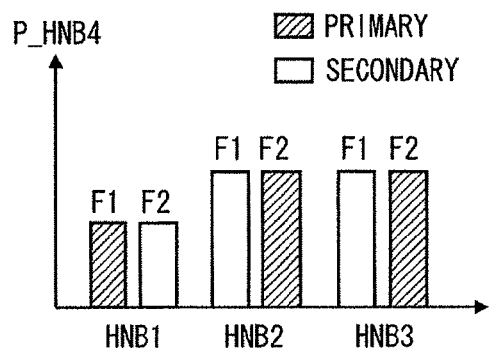
FIG. 9F is a graph showing received power in a home base station.

As the final part of the explanation of this exemplary embodiment, an example operation in which a plurality of home base stations 1 located adjacent to each other determine frequency channels for primary cells successively is explained hereinafter. FIGS. 9A, 9C and 9E are conceptual diagrams showing states in which frequency channels of primary cells of four home base stations 1 (NHB1 to HNB4) are successively determined. Assume that in HNB1 to HNB4, only two frequency channels F1 and F2 are available. FIGS. 9B, 9D and 9F are graphs showing received powers of HNB1 to HNB4.

FIG. 9A shows a case where HNB2 is newly disposed in an environment in which NHB1 is already located. HNB1 uses F1 for the primary cell, and uses F2 for the secondary cell. FIG. 9B is a graph showing a received power (RSCP) in HNB2, of P-CPICH transmitted by HNB1, and an identification result of the secondary cell. HNB2 uses F2 for its own primary cell. This is because both F1 and F2 are used by HNB1 and F2 is used for the secondary cell.

FIG. 9C shows a case where HNB3 is newly disposed in an environment in which NHB1 and HNB2 are already located. HNB1 uses F1 for the primary cell, and uses F2 for the secondary cell. Further, HNB2 uses F1 for the secondary cell, and uses F2 for the primary cell. The received power in HNB3 becomes the one shown in FIG. 9D. In this case, HNB3 uses F2 for its own primary cell. This is because although both F1 and F2 are used in the nearby primary cells, RSCP of F2 is relatively smaller.

FIG. 9E shows a case where HNB4 is newly disposed in an environment in which NHB1, NHB2 and HNB3 are already located. HNB1 uses F1 for the primary cell, and uses F2 for the secondary cell. Further, HNB2 and HNB3 use F1 for the secondary cells, and use F2 for the primary cells. The received power in HNB4 becomes the one shown in FIG. 9F. In this case, HNB4 uses F1 for its own primary cell. This is because although both F1 and F2 are used in the nearby primary cells, RSCP of F1 is relatively smaller.

As described above, the home base station 1 in accordance with this exemplary embodiment identifies the property of a nearby cell, and preferentially allocates, to its own primary cell, a frequency channel different from that used in a nearby non-secondary cell. As a result, the probability that the same frequency channel as that used in a nearby non-secondary cell is selected as a frequency channel for the primary cell of the home base station 1 is lowered. Therefore, the home base station 1 can effectively suppress interference to nearby primary cells and non-HSDPA cells preferentially over interference to nearby secondary cells.

Note that the home base station 1 may also determine a frequency channel to be allocated to a secondary cell in a similar manner to the determination of a frequency channel to be allocated to a primary cell. This exemplary embodiment is explained on the assumption that the home base station 1 is a base station supporting DC-HSDPA. However, the home base station 1 may be a base station supporting only HSDPA for a single-cell operation. Further, the home base station 1 may be a base station that supports neither HSDPA nor DC-HSDPA. In this case, the home base station 1 may determine a frequency channel to be allocated to its own non-HSDPA cell according to the above-described frequency channel determination procedure for a primary cell.

The above-described process to determine a frequency channel to be allocated that is performed by the frequency channel control unit 15 may be implemented by using a semiconductor processing apparatus such as an ASIC and a DSP. Further, the process to determine a frequency channel to be allocated may be implemented by making a computer such as a microprocessor execute a control program describing the processing steps explained above with reference to FIGS. 3 to 7 (except for the step S101 performed by the mobile station mode reception unit 16). This control program can be stored in various types of storage media, and/or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line, and the Internet.

Second Exemplary Embodiment

A home base station 2 in accordance with this exemplary embodiment performs a frequency channel determination process for a primary cell similar to that of the above-described first exemplary embodiment even during the communication operation. After the home base station 2 determines frequency channels for the primary and secondary cells and starts a communication operation, if the home base station 2 finds another frequency channel having a better condition than that of the frequency channel currently-used for the primary cell, the home base station 2 changes the frequency channel of the primary cell. When the home base station 2 allocates the same frequency channel as that of a nearby non-secondary cell (primary cell or non-HSDPA cell), the home base station 2 monitors nearby cells during the operation. The monitoring of nearby cells includes measuring other frequency channels different from the one currently-used for the primary cell. If the home base station 2 finds a frequency channel that is not used by any nearby non-secondary cell (i.e., a frequency channel having a better condition), the home base station 2 changes the frequency channel of the primary cell.

Figure 10:
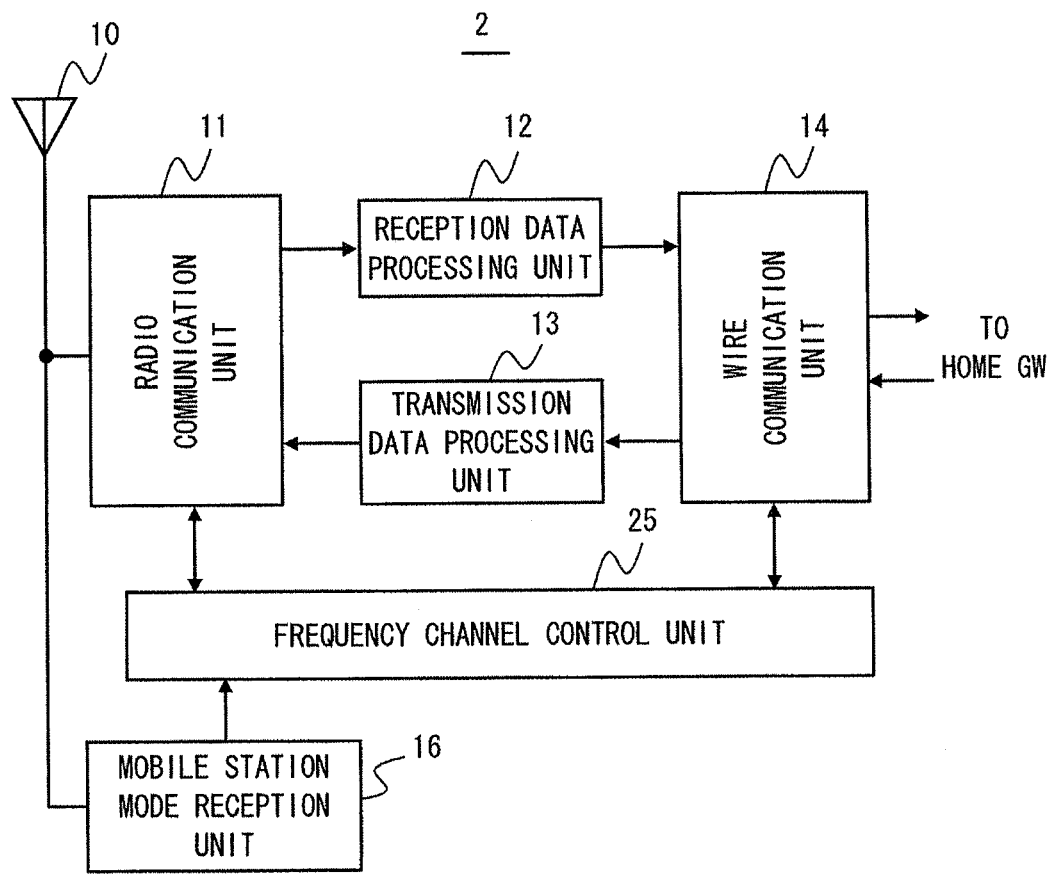
FIG. 10 is a block diagram showing a configuration example of a home base station in accordance with a second exemplary embodiment of the present invention.

FIG. 10 is a block diagram showing a configuration example of the home base station 2. The functions and operations of an antenna 10, a radio communication unit 11, a reception data processing unit 12, a transmission data processing unit 13, a wire communication unit 14, and a mobile station mode reception unit 16 shown in FIG. 10 are similar to those of the corresponding components explained above with the first exemplary embodiment.

A frequency channel control unit 25 determines frequency channels to be allocated to the primary and secondary cells through a similar procedure to that of the above-described frequency channel control unit 15 before the dual-cell operation. Further, the frequency channel control unit 25 obtains measurement information obtained by the mobile station mode reception unit 16 and searches for a frequency channel that is not used by any non-secondary cell even after communication with the mobile station 6-1 is started. If the frequency channel control unit 25 finds a frequency channel that is not used by any non-secondary cell, the frequency channel control unit 25 allocates this new-found frequency channel to the primary cell.

Figure 11:
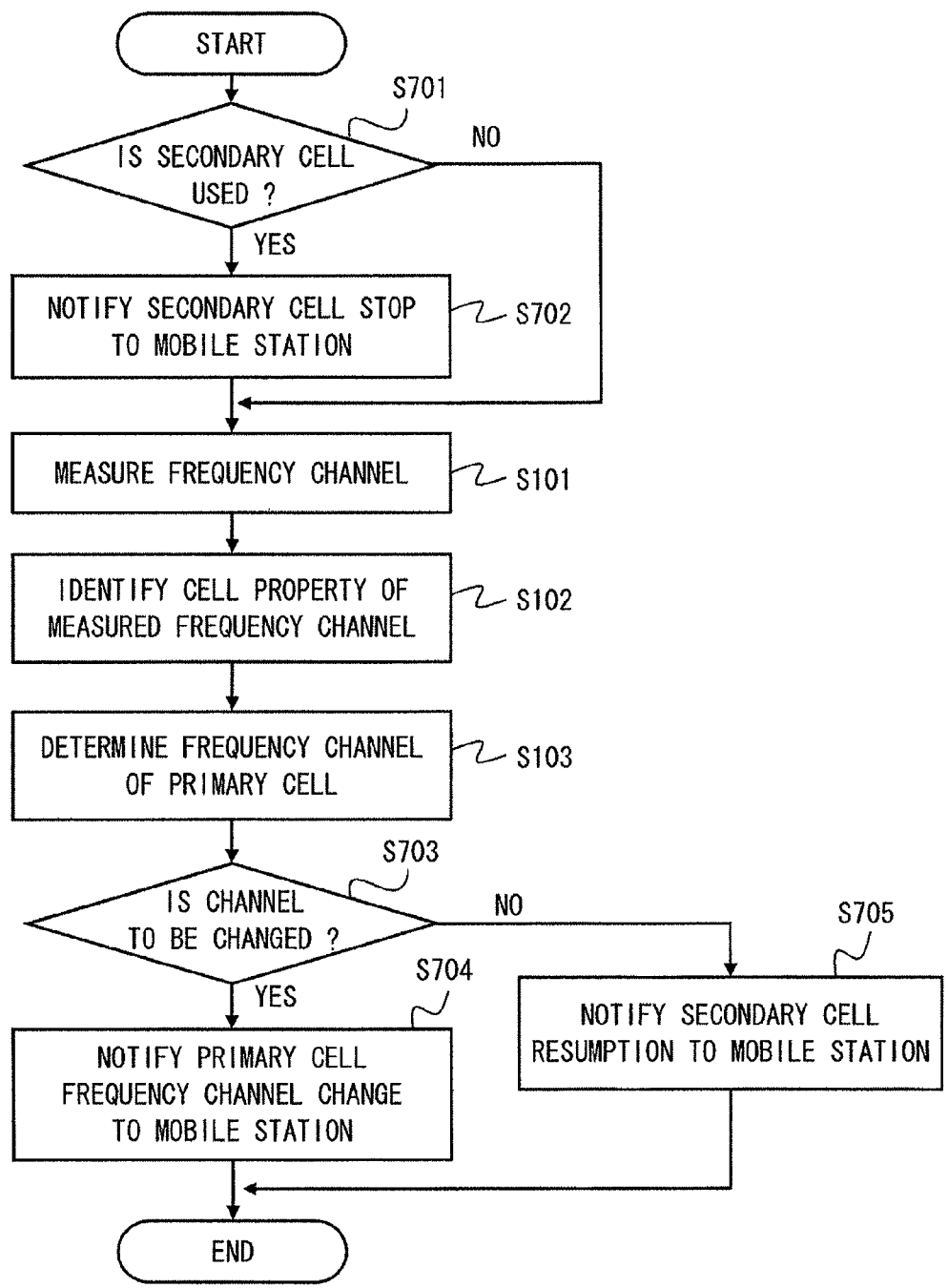
FIG. 11 is a flowchart showing an overall procedure of a process to determine a frequency to be allocated to a primary cell performed by a home base station in accordance with the second exemplary embodiment of the invention.

Next, a specific procedure to re-select a frequency channel for the primary cell is explained hereinafter with reference to FIGS. 11 and 12. FIG. 11 is a flowchart showing processing steps of a home base station 5 relating to re-selection of a frequency channel for a primary cell. The process shown in the flowchart of FIG. 11 may be performed when the same frequency channel as that used in a nearby non-secondary cell is used in the primary cell of the home base station 2. The re-selection of a frequency channel for a primary cell may be performed at predetermined regular intervals.

In a step S701, the frequency channel control unit 25 determines whether the secondary cell is used or not. When the secondary cell is used, the frequency channel control unit 25 stops the HS-DSCH transfer in the secondary cell, and notifies the mobile station 6-1 of the stop of the secondary cell (step S702). The notification of the stop of the secondary cell to the mobile station 6-1 may be carried out by transmitting a command such as RRC MESSAGE (Deactivation) and HS-SCCH ORDER (Deactivation).

In steps S101 to S103 subsequent to the step S702, processes similar to those in the corresponding steps S101 to S103 in FIG. 2 may be performed. However, the measurement of the frequency channel currently-allocated to the primary cell may be omitted.

If a frequency channel that is not used by any nearby cell or a frequency channel that is used by a nearby secondary cell is found, it is determined in the step S103 that the frequency channel for the primary cell is changed. When the change of the frequency channel for the primary cell is determined, the frequency channel control unit 25 notifies the mobile station 6-1 of the change of the frequency channel for the primary cell (steps S703 and S704). This notification may be carried out by transmitting, for example, RRC MESSAGE (Reconfiguration).

If no frequency channel that is not used by any non-secondary cell is found, the frequency channel control unit 25 notifies the mobile station 6-1 of the resumption of the secondary cell (steps S703 and S705). This notification may be transmitted by transmitting a command such as RRC MESSAGE (Activation) and HS-SCCH ORDER (Activation).

Figure 12:
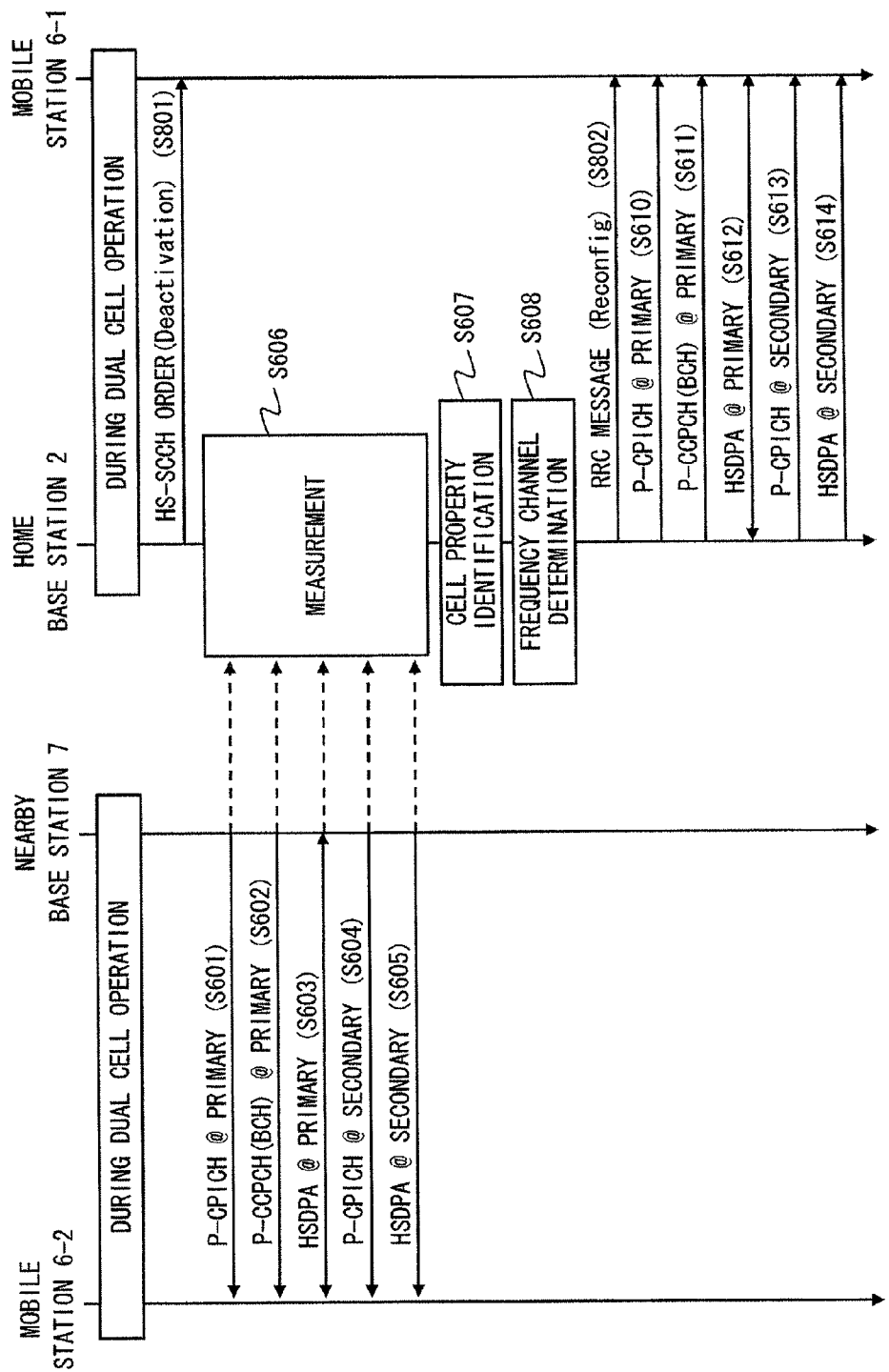
FIG. 12 is a sequence diagram showing an example of a procedure to determine a primary cell frequency channel in the second exemplary embodiment of the present invention.
Figure 13:
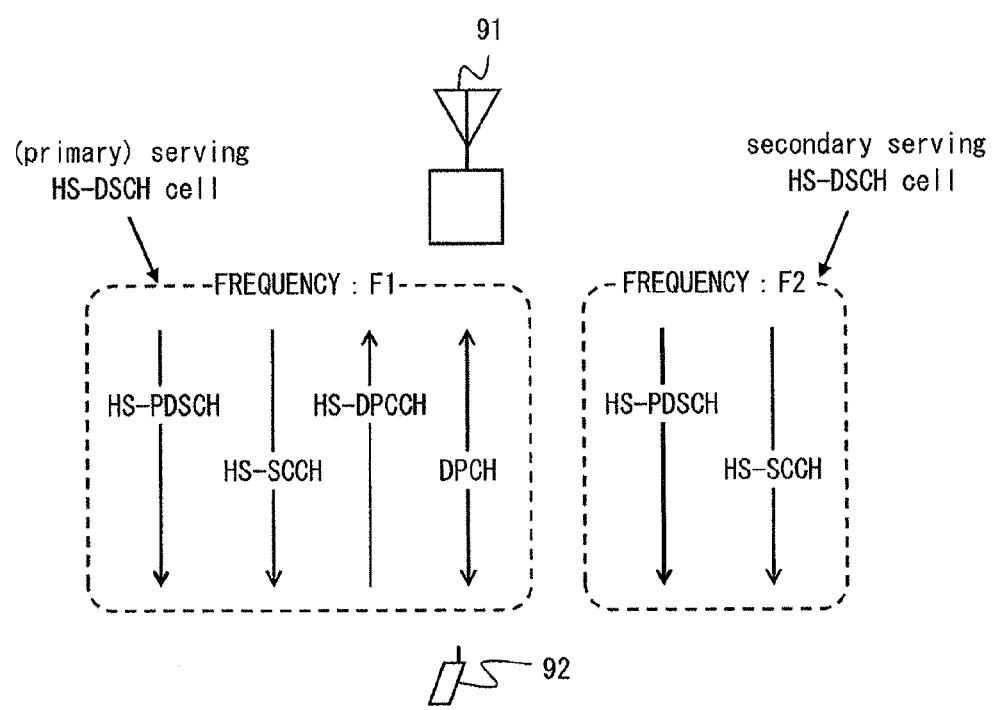
FIG. 13 shows physical channels used to perform packet communication using DC-HSDPA.

FIG. 12 is a sequence diagram showing interactions between the nearby base station 7, the home base station 2, the mobile station 6-1, and the mobile station 6-2. In a step S801, the home base station 2 stops the secondary cell by transmitting HS-SCCH ORDER (Deactivation) to the mobile station 6-1. Steps S601 to S608 in FIG. 12 are similar to the above-described corresponding steps S601 to S608 of FIG. 8.

In a step S802, the home base station 2 notifies the mobile station 6-1 of the change of the frequency channel for the primary cell by transmitting RRC MESSAGE (Reconfiguration). Note that when the frequency channel for the primary cell is not changed, the home base station 2 may notify the mobile station 6-1 of the resumption of the secondary cell as described above.

Steps S610 to S614 in FIG. 12 are similar to the above-described corresponding steps S610 to S614 of FIG. 8.

As described above, in accordance with this exemplary embodiment, even after the home base station 2 determines frequency channels for the primary and secondary cells and starts communication with the mobile station 6-1, the home base station 2 continuously monitors the use status of frequency channels. As a result, the home base station 2 can dynamically cope with the change of the use status of frequency channels, and thereby can suppress interference to nearby primary cells and non-HSDPA cells more effectively.

Note that as stated in the first exemplary embodiment, the home base station 2 may be a base station supporting only HSDPA for a single-cell operation. Further, the home base station 2 may be a base station that supports neither HSDPA nor DC-HSDPA.

Further, as stated in the first exemplary embodiment, the frequency channel determination process performed by the frequency channel control unit 25 may be implemented by using an ASIC, a DSP, a microprocessor, or the like.

Other Exemplary Embodiments

At least part of the frequency channel determination process performed by the frequency channel control units 15 and 25 described above with the first and second exemplary embodiments may be carried out by an apparatus (e.g., RNC) located in the home GW 81 or the core network 83. That is, the task of each process included in the frequency channel determination procedure for the primary cell, which are explained above as being performed by the home base stations 1 or 2, can be arbitrarily shared between the home base stations 1 or 2, and the upper layer apparatuses to which the home base stations 1 or 2 connects.

In the above-described first and second exemplary embodiments, the present invention is applied to base stations that support DC-HSDPA of the W-CDMA type. However, the application of the present invention is not limited to base stations that support the W-CDMA-type DC-HSDPA. That is, the present invention can be applied to any base stations capable of autonomously determining a frequency channel for use in radio communication with a mobile station regardless of whether their multi-access scheme for the downlink channel is CDMA or not.

In the case of the above-described DC-HSDPA of the W-CDMA type, physical channels are differentiated by the difference in orthogonal code (channelization code). Meanwhile, in the case of base stations in which OFDMA (Orthogonal Frequency Division Multiplexing Access) is used for the multi-access scheme for the downlink channel like WiMAX and LTE, physical channels are differentiated by the difference of tone (subcarrier).

Further, in the above-described first and second exemplary embodiments, the home base stations 1 and 2 determine whether a nearby cell is a secondary cell or not. However, the determination whether a nearby cell is a secondary cell or not is merely an example of the priority determination for nearby cells. That is, a base station apparatus shown below is also considered to be included in an aspect of the present invention. That is, a base station apparatus in accordance with an aspect of the present invention includes a radio communication unit that wirelessly communicate with a mobile station, and a frequency channel control unit that determines a frequency channel to be used by an own cell formed by the radio communication unit. The frequency channel control unit determines a priority of at least one nearby cell formed by at least one nearby base station, and selects a frequency channel used in a cell having a lower priority among the at least one nearby cell preferentially over a frequency channel used in a cell having a higher priority as a frequency channel to be used by the own cell. Further, the base station apparatus may determine the priority of a nearby cell, for example, based on broadcast information included in a radio signal transmitted from the at least one nearby cell.

Although the present invention has been explained above by referring to exemplary embodiments, the present invention is not limited to the above-described exemplary embodiments. Various modifications can be made to the configurations and details of the present invention by those skilled in the art without departing from the scope of the present invention.

This application is based upon and claims the benefit of priority from Japanese patent application No. 2008-308709, filed on Dec. 3, 2008, the disclosure of which is incorporated herein in its entirety by reference.

REFERENCE SIGNS LIST 1, 2 HOME BASE STATION
6-1, 6-2 MOBILE STATION
7 NEARBY BASE STATION
10 ANTENNA
11 RADIO COMMUNICATION UNIT
12 RECEPTION DATA PROCESSING UNIT
13 TRANSMISSION DATA PROCESSING UNIT
14 WIRE COMMUNICATION UNIT
15, 25 FREQUENCY CHANNEL CONTROL UNIT
16 MOBILE STATION MODE RECEPTION UNIT
81 HOME GATEWAY (HOME GW)
82 RADIO NETWORK CONTROLLER (RNC)
83 CORE NETWORK

The invention claimed is:

1. A base station apparatus comprising:
a radio communication unit being capable of wirelessly communicating with a mobile station; and
a frequency channel control unit being capable of determining a frequency channel to be used in an own cell formed by the radio communication unit,
wherein the frequency channel control unit is further capable of:
identifying whether or not a nearby cell formed by a nearby base station is a secondary cell that is dependently formed under condition of generation of a primary cell, and
preferentially selecting a frequency channel different from that used in a nearby non-secondary cell as a frequency channel to be used in the own cell,
wherein the secondary cell is a cell that does not transmit a broadcast channel and the non-secondary cell is a cell that transmits the broadcast channel, and
wherein the frequency channel control unit is further capable of selecting, as the frequency channel to be used in the own cell, a frequency channel used in a cell transmitting no broadcast channel preferentially over a frequency channel used in a cell transmitting the broadcast channel.

2. The base station apparatus according to claim 1, wherein the frequency channel control unit is further capable of selecting, as the frequency channel to be used in the own cell, a frequency channel used in a nearby secondary cell preferentially over a frequency channel used in the nearby non-secondary cell.

3. The base station apparatus according to claim 1, wherein the frequency channel control unit is further capable of identifying whether the nearby cell is the secondary cell or not based on whether a received signal from the nearby cell includes or not a predetermined physical channel.

4. The base station apparatus according to claim 1, wherein the frequency channel control unit is further capable of identifying whether the nearby cell is the secondary cell or not based on broadcast information included in a radio signal transmitted from the nearby cell.

5. The base station apparatus according to claim 4, wherein
the broadcast information includes access control information about access control for a mobile station to a cell, and
the frequency channel control unit is further capable of identifying whether the nearby cell is the secondary cell or not based on whether the access control information indicates an invalid value or not.

6. The base station apparatus according to claim 5, wherein
the access control information transmitted by the secondary cell indicates a valid value and the access control information transmitted by the non-secondary cell indicates the invalid value, and
the frequency channel control unit is further capable of selecting, as the frequency channel to be used in the own cell, a frequency channel used in a cell transmitting the access control information indicating the valid value preferentially over a frequency channel used in a cell transmitting the access control information indicating the invalid value.

7. The base station apparatus according to claim 1, wherein
the radio communication unit is further capable of forming a first cell, and a second cell that is dependently formed under condition of generation of the first cell by using a frequency channel different from that of the first cell, and
the own cell includes at least the first cell.

8. The base station apparatus according to claim 7, wherein
the base station apparatus is further capable of supporting a dual-cell HSDPA operation (DC-HSDPA) in which high speed downlink packet access (HSDPA) is simultaneously provided in the first and second cells,
the first cell is a serving HS-DSCH cell, and
the second cell is a secondary-serving HS-DSCH cell.

9. The base station apparatus according to claim 7, wherein the first and second cells are formed by using mutually different radio communication modes.

10. The base station apparatus according to claim 7, wherein a radio communication mode used in each of the first and second cells is one of W-CDMA, mobile WiMAX, and LTE (Long Term Evolution).

11. The base station apparatus according to claim 1, wherein when there are two or more secondary cells as the nearby cell, the frequency channel control unit selects, as the frequency channel to be used in the own cell, a frequency channel used in a cell having a lowest priority among the two or more secondary cells.

12. A control method of a base station apparatus, comprising:
a step (a) of identifying, by the base station apparatus, whether or not a nearby cell formed by a nearby base station is a secondary cell that is dependently formed under condition of generation of a primary cell; and a step (b) of selecting, by the base station apparatus, as a frequency channel to be used in an own cell formed by the base station apparatus, a frequency channel different from that used in a nearby non-secondary cell preferentially over the frequency channel used in the nearby non-secondary cell, wherein the secondary cell is a cell that does not transmit a broadcast channel and the non-secondary cell is a cell that transmits the broadcast channel, and wherein in the step (b), said selecting comprises selecting, as the frequency channel to be used in the own cell, a frequency channel used in a cell transmitting no broadcast channel preferentially over a frequency channel used in a cell transmitting the broadcast channel.

13. The method according to claim 12, wherein in the step (b), said selecting includes selecting, as the frequency channel to be used in the own cell, a frequency channel used in a nearby secondary cell preferentially over a frequency channel used in the nearby secondary cell.

14. The method according to claim 12, wherein in the step (b), said selecting includes identifying whether the nearby cell is the secondary cell or not based on whether a received signal from the nearby cell includes or not a predetermined physical channel.

15. The method according to claim 12, wherein in the step (b), said selecting includes identifying whether the nearby cell is the secondary cell or not based on broadcast information included in a radio signal transmitted from the nearby cell.

16. The method according to claim 15, wherein
the broadcast information includes access control information about access control for a mobile station to a cell, and
in the step (b), said identifying includes identifying whether the nearby cell is the secondary cell or not based on whether the access control information indicates an invalid value or not.

17. A non-transitory storage medium storing a program that causes a computer to perform control processing relating to a base station apparatus that wirelessly communicates with a mobile station,
the control processing comprising:
a step (a) of identifying whether or not a nearby cell formed by a nearby base station is a secondary cell that is dependently formed under condition of generation of a primary cell; and
a step (b) of selecting, as a frequency channel to be used in an own cell formed by the base station apparatus, a frequency channel different from that used in a nearby non-secondary cell preferentially over the frequency channel used in the nearby non-secondary cell,
wherein the secondary cell is a cell that does not transmit a broadcast channel and the non-secondary cell is a cell that transmits the broadcast channel, and
wherein in the step (b), said selecting comprises selecting, as the frequency channel to be used in the own cell, a frequency channel used in a cell transmitting no broadcast channel preferentially over a frequency channel used in a cell transmitting the broadcast channel.

18. The non-transitory storage medium storing a program according to claim 17, wherein in the step (b), said selecting includes selecting, as the frequency channel to be used in the own cell, a frequency channel used in a nearby secondary cell preferentially over a frequency channel used in the nearby non-secondary cell.

19. A radio communication system comprising first and second base stations, wherein
the first base station comprises:
radio communication unit being capable of wirelessly communicating with a mobile station; and
frequency channel control unit being capable of identifying whether or not a nearby cell formed by the second base station is a secondary cell that is dependently formed under condition of generation of a primary cell, and preferentially selecting a frequency channel different from that used in a nearby non-secondary cell as a frequency channel to be used in an own cell formed by the radio communication unit,
wherein the secondary cell is a cell that does not transmit a broadcast channel and the non-secondary cell is a cell that transmits the broadcast channel, and
wherein the frequency channel control unit is further capable of selecting, as the frequency channel to be used in the own cell, a frequency channel used in a cell transmitting no broadcast channel preferentially over a frequency channel used in a cell transmitting the broadcast channel.

20. The radio communication system according to claim 19, wherein the frequency channel control unit is further capable of selecting, as the frequency channel to be used in the own cell, a frequency channel used in a nearby secondary cell preferentially over a frequency channel used in the nearby non-secondary cell.

21. The radio communication system according to claim 19, wherein the frequency channel control unit is further capable of identifying whether the nearby cell is the secondary cell or not based on whether a received signal from the second base station includes or not a predetermined physical channel.

22. The radio communication system according to claim 19, wherein
the second base station is further capable of transmitting a radio signal containing broadcast information, and
the frequency channel control unit is further capable of identifying whether the nearby cell is the secondary cell or not based on the broadcast information included in the radio signal transmitted from the second base station.

23. The radio communication system according to claim 22, wherein
the broadcast information is further capable of including access control information about access control for a mobile station to a cell, and
the frequency channel control unit is further capable of identifying whether the nearby cell is the secondary cell or not based on whether the access control information indicates an invalid value or not.

* * * * *